United States Patent [19]
Kelly

[11] Patent Number: 5,795,664
[45] Date of Patent: Aug. 18, 1998

[54] RECHARGEABLE BATTERY SYSTEM HAVING INTELLIGENT TEMPERATURE CONTROL

[75] Inventor: Stephen J. Kelly, Marion, Iowa

[73] Assignee: Norand Corporation, Cedar Rapids, Iowa

Related U.S. Application Data

[60] Provisional application No. 60/007,999, Dec. 5, 1995.

[21] Appl. No.: 761,094
[22] Filed: Dec. 5, 1996
[51] Int. Cl.⁶ ................................... H01M 10/50
[52] U.S. Cl. ................ 429/7; 429/62; 429/120; 320/35; 340/636
[58] Field of Search ............. 429/90–93, 7, 429/62, 120; 320/35, 48; 307/150; 361/434; 340/636, 640, 643

[56] References Cited

U.S. PATENT DOCUMENTS

| | | |
|---|---|---|
| 5,362,942 | 11/1994 | Vanderslice, Jr. et al. ....... 429/62 X |
| 5,411,816 | 5/1995 | Patino ........................... 429/7 |
| 5,480,734 | 1/1996 | Schulz et al. .................. 429/7 |
| 5,508,126 | 4/1996 | Braun ........................... 429/120 X |

Primary Examiner—Anthony Skapars
Attorney, Agent, or Firm—Stanford & Bennett, L.L.P.

[57] ABSTRACT

A rechargeable battery system utilizes intelligent temperature control to enhance and optimize battery cell capacity and performance in low and high temperature environments. A temperature varying element (heating and/or cooling) modifies the temperature of battery cells utilizing an amount of energy that is less than that gained by making such temperature modification. A control circuit optimally control the temperature varying element to maximize battery operation. The control circuit also utilizes the temperature varying element to prevent cell damage in extreme conditions. A battery pack contains a plurality of cells also houses the control circuit, the temperature varying element and a temperature sensor. At least a portion of the control circuit and temperature varying element may alternately be located within a portable electronic device. A second temperature sensor may be added to monitor ambient temperature, and Insulating material may be used in the construction of the battery pack housing.

20 Claims, 9 Drawing Sheets

RECHARGEABLE BATTERY SYSTEM HAVING INTELLIGENT TEMPERATURE CONTROL

CROSS-REFERENCE TO RELATED APPLICATIONS

The present application claims priority pursuant to 35 U.S.C. Sec. 119(e) to U.S. Provisional Application Ser. No. 60/007,999, filed Dec. 5, 1995, which is hereby incorporated herein by reference in its entirety.

BACKGROUND

1. Technical Field

The present invention relates generally to rechargeable batteries, and, specifically, to temperature control of rechargeable batteries utilized in high and low ambient temperature environments.

2. Related Art

Portable electronic devices powered by rechargeable batteries are often utilized in environments having low or high ambient temperatures. Ambient temperatures below zero degrees Celsius, for example, affect the chemical reactions internal to the battery pack such that available battery capacity is significantly reduced. In addition, under such low temperature conditions, the effective battery impedance increases, causing the battery to waste energy during use. Batteries exposed to high temperatures also exhibit similar performance degradation.

Thus, there lies a need for a rechargeable battery system which addresses the foregoing problems. Furthermore, such a system should solve the foregoing problems without utilizing more of the battery energy than would have otherwise been lost.

SUMMARY OF THE INVENTION

The present invention solves the foregoing and other problems by providing intelligent temperature control of battery systems utilized in high or low temperature environments. In particular, many aspects of the present invention may be found in a battery pack used in a portable electronic device. The battery pack comprises a housing that encloses a plurality of electrochemical cells, a temperature varying element, a temperature sensor and a control circuit. The control circuit is responsive to the temperature sensor by selectively controlling the operation of the temperature varying element. The temperature varying element may comprise a heating element, a cooling element or both.

In some embodiments, the control circuit selectively controls the operation of the temperature varying element by considering whether the energy required to conduct such operation is predicted to yield overall energy savings. The control circuit may also (or alternatively) selectively control such operation by considering, for example: a) whether the battery pack is in use; b) the likelihood of battery damage without such operation; c) considering the energy efficiency of such operation; and/or d) whether the battery pack is being charged. Likewise, the control circuit may also (or alternatively) provide such control to attempt to reach a target temperature within the housing.

These and other aspects of the present invention may also be found in a portable electronic device that operates from battery power. The portable electronic device comprises a battery pack housing that encloses at least the temperature sensor and the at least one electrochemical cell. The portable electronic device also comprises both a temperature varying element disposed to affect the temperature within the battery pack housing, and a control circuit responsive to the temperature sensor by selectively controlling the operation of the temperature varying element.

In some embodiments, the temperature varying element and at least part of the control circuit is disposed within the portable electronic device external to the battery pack housing. In others, the temperature varying element and at least part of the control circuit is disposed within the battery pack housing. The portable electronic device may also comprise a second temperature sensor that produces an indication of the temperature outside of the battery pack housing. Moreover, the control circuit may also operate in the various ways described above.

Moreover, other aspects of the present invention will become apparent with further reference to the drawings and specification which follow.

DETAILED DESCRIPTION

Figure 1:
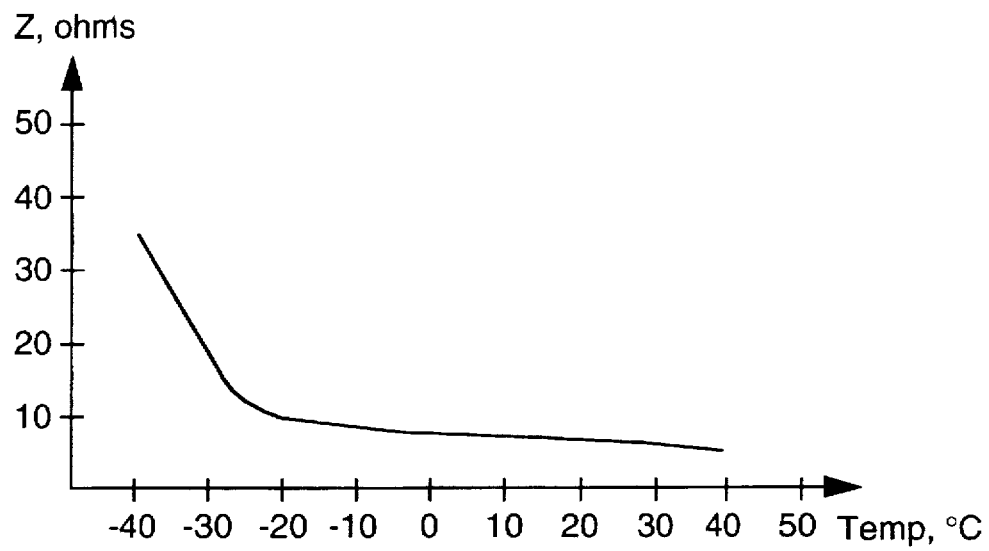
FIG. 1 illustrates the internal battery impedance versus battery temperature curve for a typical rechargeable battery such as nickel-cadmium, nickel-metal-hydride or lithium-ion electrochemical cells.

FIG. 1 illustrates the internal battery impedance versus battery temperature curve for a typical rechargeable battery pack that may include nickel-cadmium, nickel-metal-hydride or lithium-ion electrochemical cells. Most portable electronic devices operate at temperatures above zero degrees Celsius where the internal battery impedance of a battery packs powering the devices is relatively low. However, at operating temperatures below zero degrees Celsius, the internal battery impedance of the battery packs increases significantly. The increased internal battery impedance increases losses thereby reducing operating efficiency and reducing duration between charges.

Figure 2:
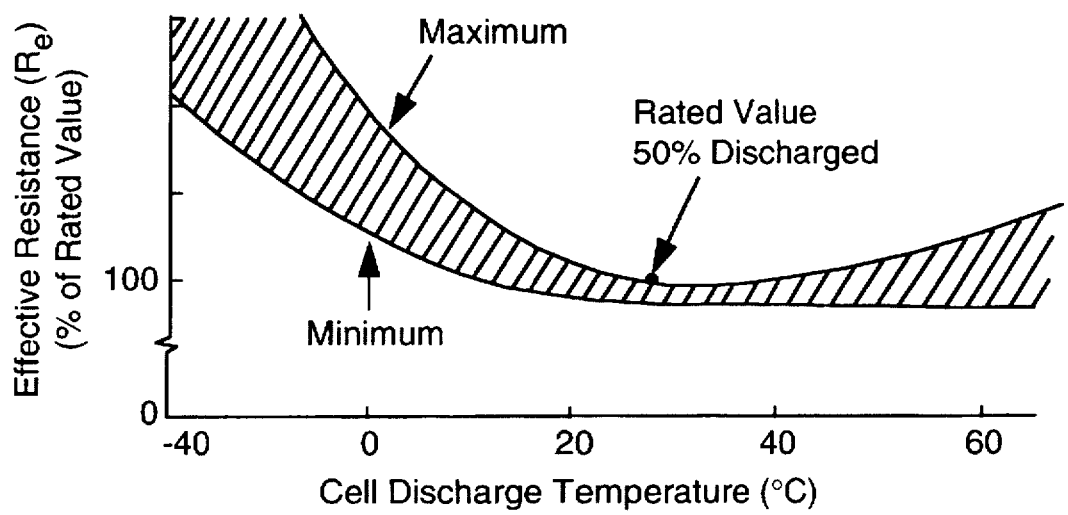
FIG. 2 illustrates the effective resistance versus discharge temperature curve for a typical rechargeable electrochemical cell.

FIG. 2 illustrates the effective resistance versus discharge temperature curve for a typical rechargeable electrochemical cell of a battery pack. For any given cell discharge temperature, effective resistance of an electrochemical cell varies over a range. However, as illustrated, effective resistance of the electrochemical cells is at a minimum at approximately twenty (20) degrees Celsius and increases at relatively higher and lower temperatures. Thus, maintaining electrochemical cell temperature at approximately twenty degrees Celsius during operation would minimize losses caused by internal resistance of the electrochemical cell.

Figure 3:
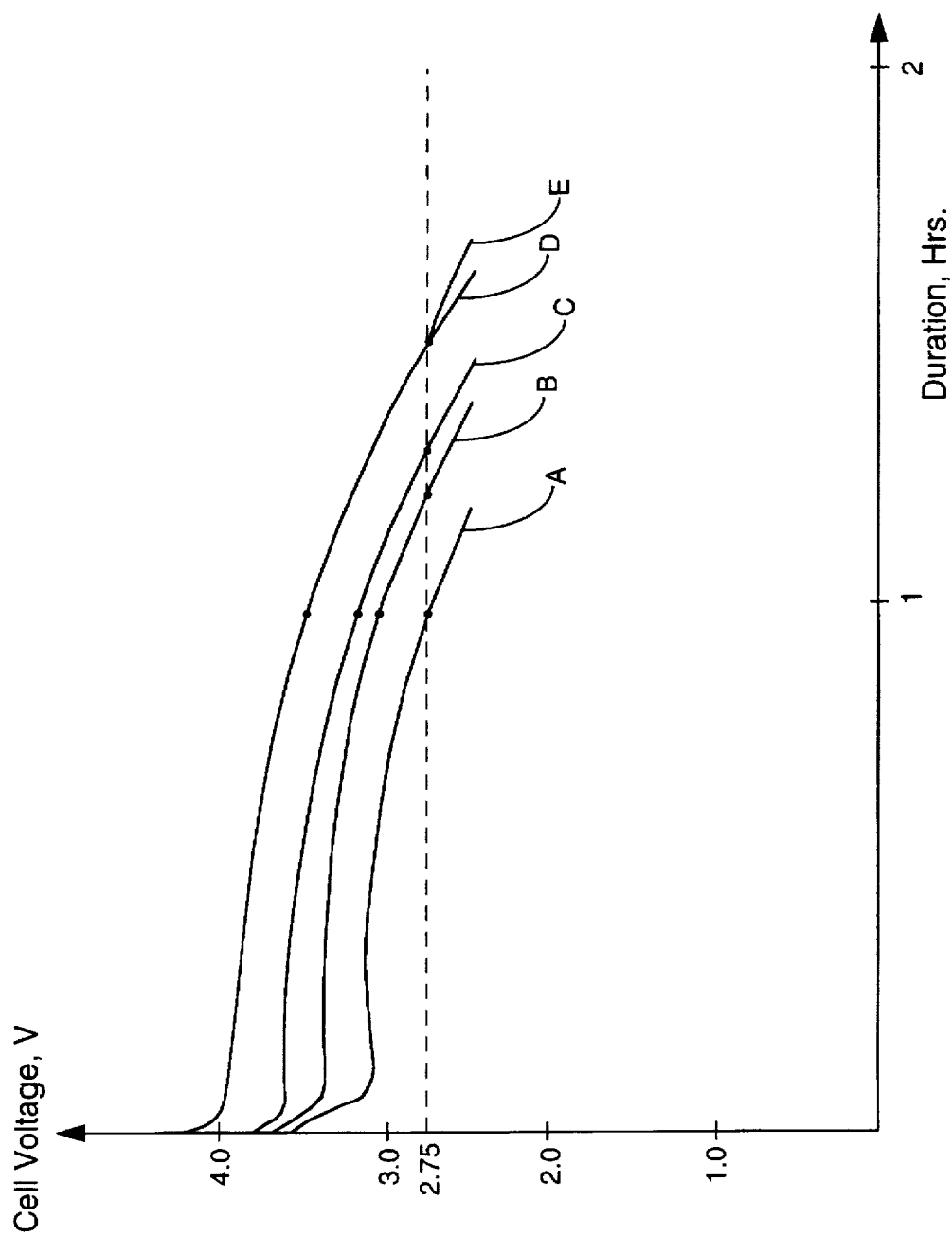
FIG. 3 illustrates the temperature dependence of the discharge curve profile for a typical rechargeable electrochemical cell such as lithium-ion type cells.

FIG. 3 illustrates the temperature dependence of a discharge curve profile for a typical rechargeable electrochemical cell such as a lithium-ion type cell. During acceptable operation, a lithium-ion cell produces a terminating voltage of at least 2.75 volts. When the terminating voltage produced by the lithium-ion cell decreases to below 2.75 volts, the cell is deemed discharged and is generally removed from operation. Thus, cell operation at a terminal voltage of at least 2.75 volts for a maximum time duration is sought. Discharge profile curves A, B, C, D and E represent typical operating curves for a lithium-ion cell at temperatures of −20 degrees Celsius, −10 degrees Celsius, zero degrees Celsius, 23 degrees Celsius and 40 degrees Celsius, respectively. As illustrated, at operating temperatures of less than 23 degrees Celsius, the terminating voltage produced by the cell decreases to 2.75 volts earlier than when operating at 23 degrees Celsius or above.

Therefore, with reference to both FIGS. 2 and 3, operating efficiency of the cells of a battery pack is optimized when the cells operate within a particular temperature range. For the lithium-ion cell, an optimum temperature range extends from approximately 20 degrees Celsius to approximately 40 degrees Celsius. However, the operating temperature of the cells is dependent upon heat generated by the cell resistance, the temperature of the external environment in which the battery pack operates and the rate at which heat energy escapes from the battery pack or enters the battery pack from the external environment.

The present invention includes altering the operating temperature of a battery pack to extend its duration of operation, wherein duration of operation may be defined as the time under load from charge until a time when the terminal voltage produced by the battery pack decreases below an acceptable threshold. During normal operation, altering battery pack temperature consumes energy provided by the battery pack that decreases the duration of operation of the battery pack. Thus, in determining whether to alter battery pack temperature, energy gains achieved by altering battery pack temperature must exceed energy lost in altering the battery pack temperature.

Figure 4B:
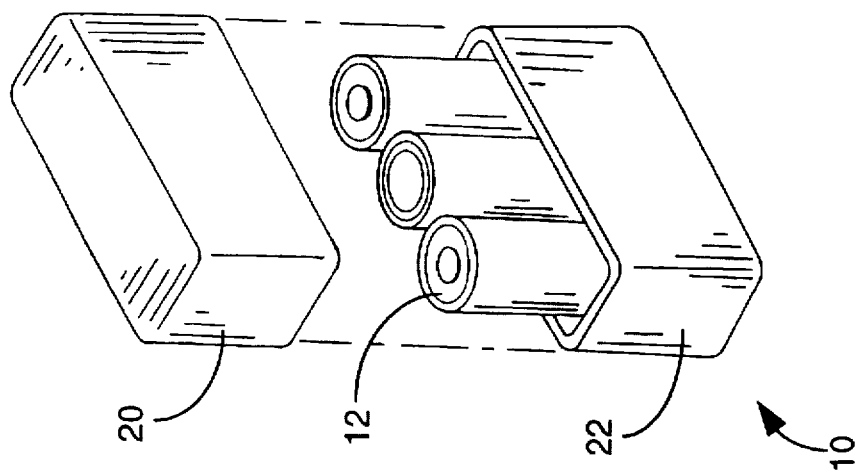
FIGs. 4A and 4B are perspective diagrams illustrating enclosures according to the rechargeable battery system of the present invention.
Figure 4A:
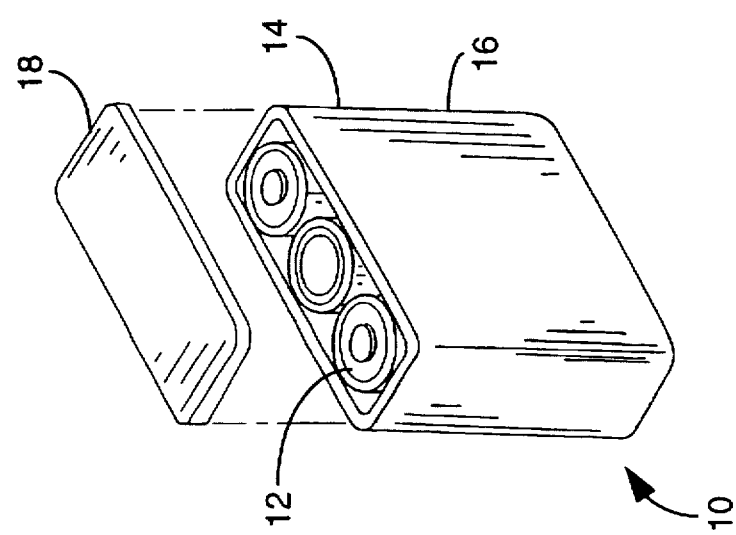

FIGs. 4A and 4B are perspective diagrams illustrating enclosures according to the rechargeable battery system of the present invention. A rechargeable battery pack 10 includes several electrochemical cells 12 connected in series to produce a battery pack output voltage which is the sum of the output voltages of the individual cells 12. The electrochemical cells 12 are contained within an enclosure 14 which includes a lower cup member 16 and a lid 18. The lower cup member 16 and the lid 18 include connections among the electrochemical cells 12 and electrically couple the electrochemical cells 12 to a portable electronic device in which the rechargeable battery pack 10 may reside. The enclosure 14 shown in FIG. 4B includes two half-cup members 20 and 22 rather than the full cup member 16 and lid 18 of FIG. 4A.

In one embodiment of the battery pack 10, the enclosure 14 provides a high thermal resistivity to thermally insulate the electrochemical cells 12. More particularly, the enclosure 14 may be constructed of highly thermally insulative ceramic materials that were employed on the NASA space shuttle such as insulating silicon and aluminum borosilicate. However, other insulating materials may also be employed. During normal operation when the battery pack 10 provides power to a portable electronic device, the internal series resistance of the electrochemical cells 12 produces heat. Thus, with the enclosure 14 providing resistance to the flow of heat from the electrochemical cells 12 to the external environment, the battery pack 10 may require no additional heating beyond that produced by the electrochemical cells 12.

In another embodiment of the present invention, the enclosure 14 is constructed at least in part with material having low thermal resistivity. Thus, heating or cooling may be delivered to the enclosure via a temperature varying element located within a corresponding portable electronic device. In this embodiment, only a surface of the enclosure 14 facing the temperature varying element need exhibit such low thermal resistivity. The other surfaces of the enclosure 14 may be insulated to prevent heat flow. In still another embodiment of the present invention, the enclosure 14 is constructed to provide a high thermal resistivity and includes a temperature varying element located within the enclosure 14 that varies the temperature within the enclosure 14.

Figure 5:
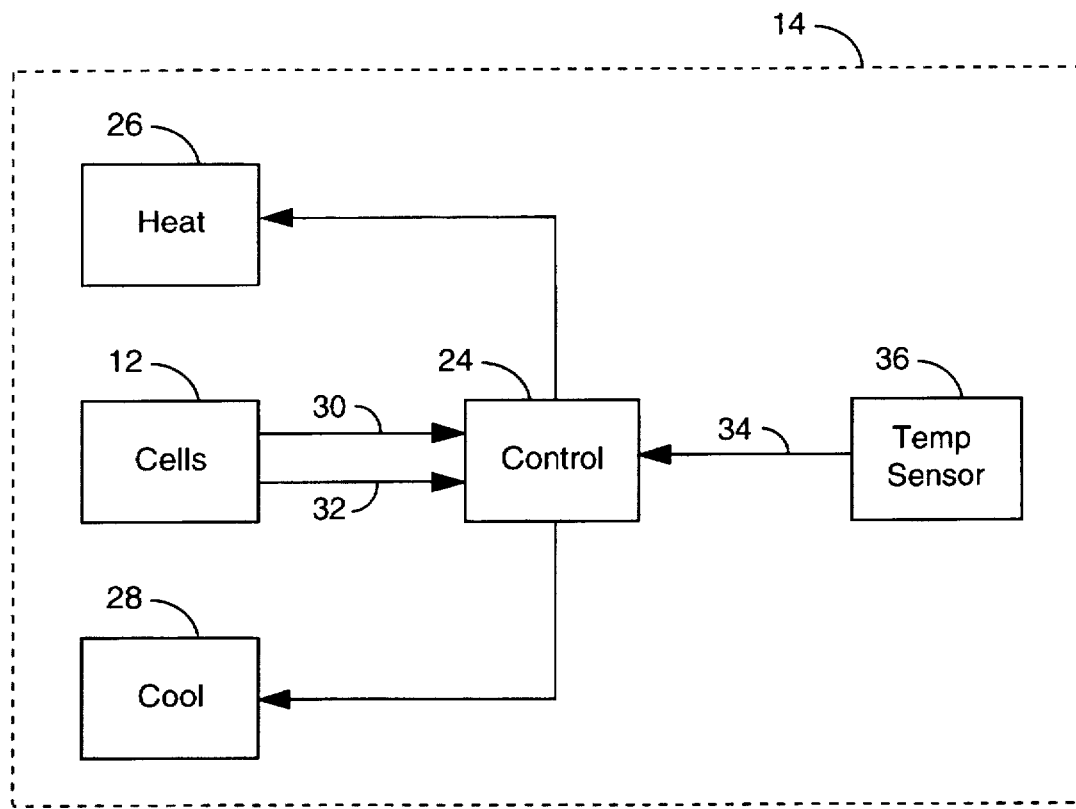
FIG. 5 is a block diagram illustrating a thermally controlled battery system according to the present invention.

FIG. 5 is a block diagram illustrating a thermally controlled battery system 14 according to the present invention. The thermally controlled battery system 14 includes electrochemical cells 12, a control circuit 24, a heating element 26, a cooling element 28 and a temperature sensor 36. The control circuit 24 monitors operation of the electrochemical cells 12 by receiving output voltage 30 and output current 32 from the cells 12 as well as temperature of the electrochemical cells 34 from the temperature sensor 36 located adjacent the cells 12. The control circuit 24 includes a microcontroller, memory and associated control electronics. However, the control circuit 24 could include other circuitry capable of performing the required functions of the control circuit 24. The control circuit 24 provides control signals to the heating element 26 and cooling element 28 to alter the temperature of the electrochemical cells 12.

The control circuit 24 monitors the output voltage 30, output current 32 or both the output voltage 30 and output current 32 to determine loading conditions of the electrochemical cells 12. The control circuit 24 may calculate the amount of energy previously expended by the electrochemical cells 12 based upon the various readings of the output voltage 30 and output current 32 over time since the last charge. Based upon loading since the last charge, the control circuit 24 may then estimate a duration of operation until discharge for the electrochemical cells 12. Control circuit 24 calculations may also include calculating the amount of energy previously consumed by the internal resistance of the electrochemical cells 12 and the amount of energy that will be consumed by the internal resistance of the electrochemical cells 12 during continued operation.

The control circuit 24 also receives electrochemical cell temperature 34 from the temperature sensor 36. Based upon the electrochemical cell temperature 34, the control circuit 24 determines whether the temperature of the electrochemical cells resides within an acceptable operating range. In one embodiment of the present invention the, the acceptable operating range is defined by a target temperature. In the case of lithium-ion batteries, this target temperature may be 20 degrees Celsius, 23 degrees Celsius or another temperature at which the electrochemical cells 12 operate efficiently. In this embodiment, the control circuit 24 operates the heating element 26 and the cooling element 28 to maintain the temperature of the electrochemical cells 12 at or near the target temperature.

In another embodiment, the acceptable operating range is defined by a lower threshold temperature and an upper threshold temperature. When the temperature of the electrochemical cells 12 is below the lower threshold temperature, the control circuit 24 operates the heating element 26 to raise the temperature of the electrochemical cells 12. When the temperature rises above the lower threshold temperature to a second lower threshold temperature, the control circuit 24 disables the heating element. Further, when the temperature of the electrochemical cells 12 is above the upper threshold temperature, the control circuit 24 enables the cooling element 78 to lower the temperature of the electrochemical cells 12. The control circuit 24 disables the cooling element 78 when a second upper threshold temperature located slightly below the upper threshold temperature is reached. Thus, during any alteration of the temperature of the electrochemical cells 12, the control circuit 24 alters the temperature of the electrochemical cells 12 so that the temperature of the electrochemical cells 12 moves to a point within the operating range by a transition margin.

The heating element 26 may include a heating coil or resistor powered by the electrochemical cells 12. However, other types of heating sources may also be employed as the heating element 26. The cooling element 28 may comprise a Peltier effect junction device or another cooling device that, when enabled, removes heat from the electrochemical cells 12. Separately or in combination, the heating element 24 and the cooling element 28 operate as a temperature varying element to alter the temperature of the electrochemical cells 12. In one embodiment, a rate of heat delivered by the heating element 26 or removed by the cooling element 28 may be adjusted to a particular value. However, in another embodiment, the heating element 26 and/or cooling element 28 may only be cycled on and off without adjustment for rate of heat.

Based upon the characteristics of the heating coil 26, the thermal properties of the electrochemical cells 12, the heat transfer characteristics of a housing 14 containing the electrochemical cells 12 and an external temperature, the control circuit 24 determines the amount of energy required to maintain the temperature of the electrochemical cells 12 within the acceptable operating range. Based upon the historical loading of the electrochemical cells 12, estimated behavior of the electrochemical cells 12 and the temperature of the electrochemical cells 12, the control circuit 24 estimates a duration of operation of the electrochemical cells 12 without alteration of the temperature of the electrochemical cells 12. The control circuit 24 also estimates a duration of operation of the electrochemical cells 12 with alteration of the temperature of the electrochemical cells 12. When a longer duration of operation would be achieved by altering the temperature of the electrochemical cells 12, the control circuit 24 alters the temperature of the electrochemical cells 24. However, when an equal or shorter duration of operation would be achieved by not altering the temperature of the electrochemical cells 12, the control circuit 24 does not alter the temperature of the electrochemical cells.

Operation of the thermally controlled battery system 14 may also be analyzed with respect to energy consumption and energy savings. The control circuit 24 alters the temperature of the electrochemical cells 12 by first determining whether the energy required to alter the temperature of the electrochemical cells 12. The control circuit 24 then determines the amount of energy that would be gained during the extended duration of operation caused by altering the temperature of the electrochemical cells 12. If more energy is gained through the extended duration of operation than is consumed in altering the temperature of the electrochemical cells 12, the control circuit 24 alters the temperature of the electrochemical cells 24. Thus, the control circuitry 24 alters the temperature of the electrochemical cells 24 by considering the energy efficiency of a temperature varying operation.

Typical nickel-metal-hydride electrochemical cells ("NiMH cells") produce 30 percent of nominal battery capacity at −25 degrees Celsius and produce 90 percent of nominal battery capacity at −5 degrees Celsius. For typical NiMH cells having a nominal capacity of 1.5 ampere hours, 20 percent of the battery capacity, 300 mA-hrs, could be used to provide 2 watt-hours of heat to maintain the battery temperature at −5 degrees Celsius resulting in an available battery capacity of 70 percent of nominal capacity. Thus, 20 percent of nominal capacity was used to increase the available battery capacity by 50 percent of nominal capacity resulting in an energy gain of 30 percent of nominal capacity. Thus, in this example, the control circuit 24 raises the temperature of the NiMH cells to −5 degrees Celsius and holds the temperature at −5 degrees Celsius during operation, the operation being energy efficient as a whole.

Figure 6:
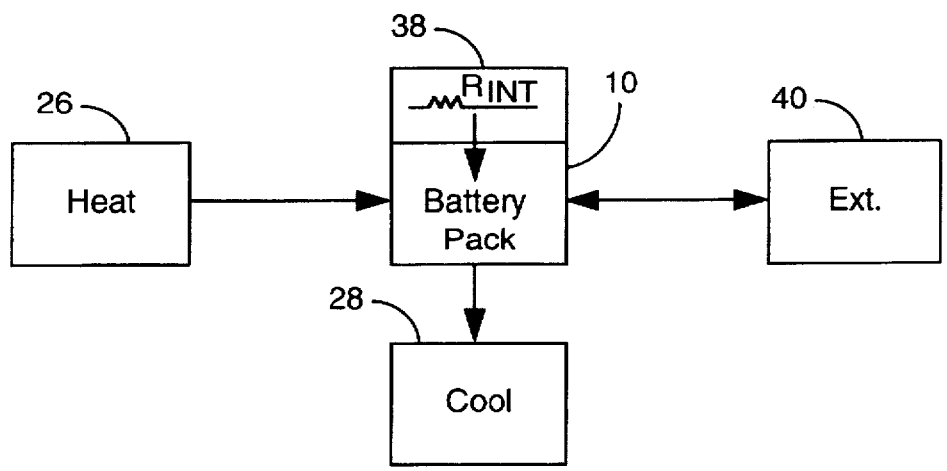
FIG. 6 is a thermal flow model of the thermally controlled rechargeable battery system according to the present invention.

FIG. 6 is a thermal flow model of the thermally controlled rechargeable battery pack 10 according to the present invention. The battery pack 10 generates heat energy due to the I-R heating from the internal battery resistance 38. Heating element 26 adds heat to the battery pack 10 when activated. Cooling element 28 removes heat from the battery pack 10 when activated. Further, the battery pack 10 may gain heat from, or lose heat to an external environment 40 depending upon the temperature of the battery pack 10, the temperature of the external environment 40 and the heat transfer characteristics between the battery pack 10 and the external environment 40.

In a mode of operation where the battery pack 10 has a temperature below the external environment 40 and the heat generated by the internal resistance 38 equals the heat lost to the external environment 40. The temperature of the battery pack 10 therefore remains within the acceptable operating range without heat input from the heating element 26 or head removal by the cooling element 28.

In another mode of operation in an external environment 40 with a temperature below the acceptable operating range and the heat generated by the internal resistance 38 is less than the heat lost to the external environment 40. The control circuit 24 therefore selectively activates the heating element 26 to raise the temperature of the battery pack to the acceptable operating range. In this mode of operation, as well as the previously described mode of operation, the cooling element 28 was not required. Therefore, in some applications of the battery pack 10 of present invention, the cooling element 28 may not be required.

In yet another mode of operation of the battery pack 10, heat flows into the battery pack 10 from the external environment 40. Further, heat generated by the internal resistance 38 remains within the battery pack 10. Here, the control circuit 24 selectively operates the cooling element 28 to reduce the temperature of the battery pack 10 to be within the acceptable range. Therefore, in other applications such as this, the heating element 26 may not be required.

In still another mode of operation, an electronic device in which the battery pack 10 is installed moves within various external environments 40, each of which has differing temperatures. While some of the external environments 40 have low temperatures, other of the external environments 40 have high temperatures. Thus, at any given point in its operation, the control circuit 24 may have to raise or lower the temperature of the battery pack 10 to the acceptable range. In this mode, the battery pack 10 requires both the heating element 26 and the cooling element 28. Of course external environment 40 temperature affects the efficiency of any heating or cooling and may be considered by the control circuit 24 in cooling.

Operation of the battery pack 10 depends not only upon operating conditions but also upon initial conditions. When the temperature of the battery pack 10 is equal to a low external environment 40 temperature, e.g. −20 degrees Celsius, substantial energy may be required to raise the temperature of battery pack 10 to the acceptable operating range. For a Sony 18650 Lithium-Ion cell 12 having a mass of 40 grams with a specific heat of 0.85 calories per gram-degree Celsius, the energy required to heat the cell 12 from −20 degrees Celsius to 20 degrees Celsius is 1.58 watt-hours. The Sony 18650 cell 12 has a nominal capacity of 4.6 watt-hours. Thus, from the low initial temperature, approximately one-third of the available energy of the cell 12 is required to heat the thermal mass of the cell 12. The approximate gain in run time of the cell 12 would be increased from just under one hour to approximately 1.5 hours. However, one-third of the capacity was consumed in heating the cell 12. Thus, heating of the cell 12 produced only marginal benefits.

Heating the cell 12 to an intermediate point temperature may, in some cases, provide greater energy benefits. The control circuit 24 therefore continuously monitors the amount of energy consumed in raising the temperature of the cell 12 and may halt its operation at any temperature point if the control circuit 24 determines that further heating is not warranted from an efficiency standpoint. Based upon known characteristics of the cell 12 stored in memory in the control circuit 24, the control circuit 24 considers not only the temperature of the cell 12 but the external environment temperature 40 and cell 12 loading in determining a target temperature for the cell 12. In some instances, low operating temperatures may damage the cell 12. The control circuit 24 therefore considers potential cell 12 damage as well in adjusting the temperature of the cell 12.

During another initial condition, the battery pack 10 is warmed to a target temperature during charging when heating and cooling energy is provided by an external source. To maintain the temperature of the battery pack 10 at the target temperature, the heating element 26 or cooling element 28 need only offset the heat generated by the internal resistance 38 and that gained or lost from the external environment 40. During normal operation, energy consumed in maintaining the temperature of the battery pack 10 is relatively small as compared to the energy gains realized in extended run times.

When the battery pack 10 is not in use, the control circuit 24 may deactivate its operation so as to not regulate the temperature of the battery pack 10. The control circuitry 24 could make a decision not to regulate the temperature of the battery pack 10 based upon a loading of the battery pack 10. The control circuit 24 could also be deactivated by a control signal received from an electronic device in which the battery pack 10 operates. The control circuit 24 could also deactivate itself in minimum loading conditions in which temperature control of the battery pack 10 would require an amount of energy unjustified by the energy output of the battery pack 10.

Figure 7:
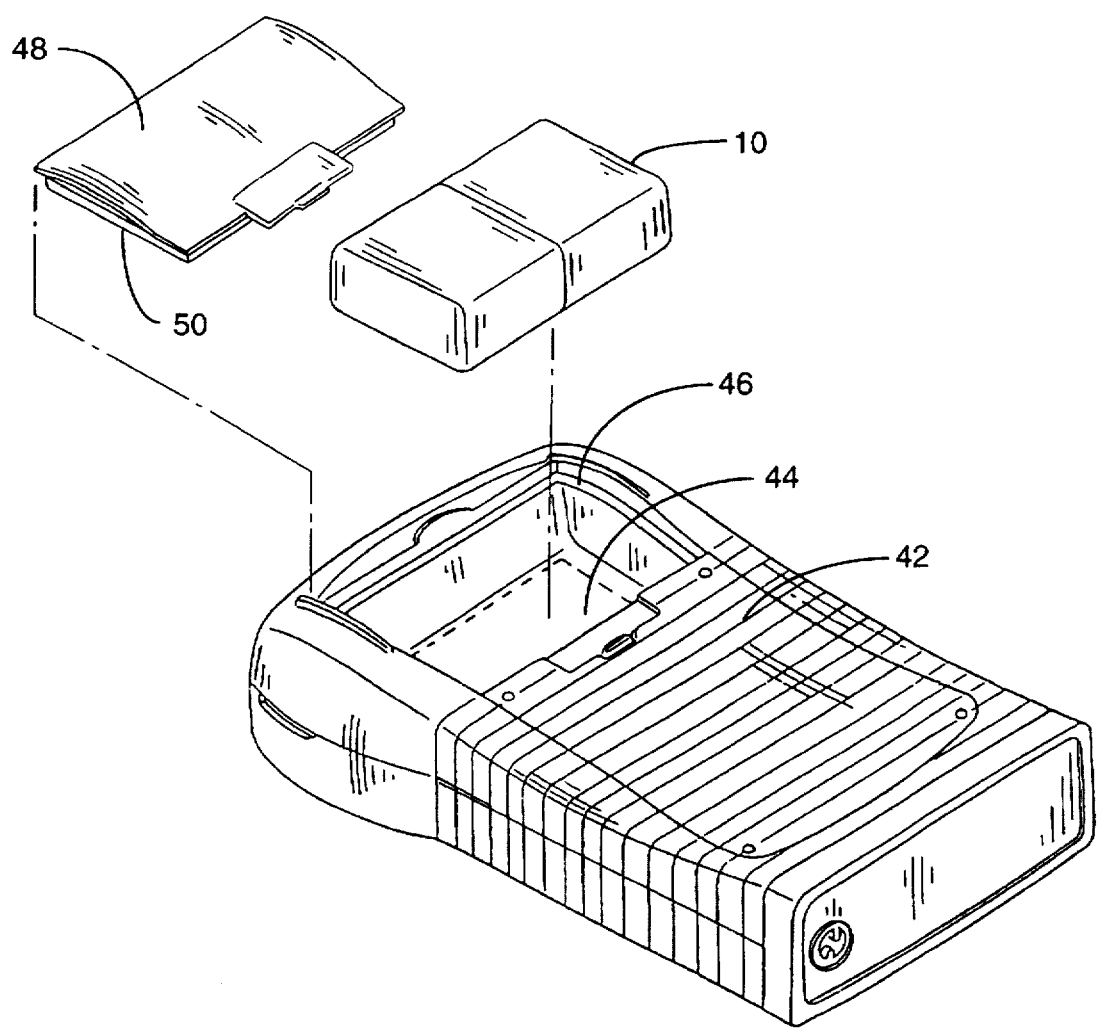
FIG. 7 illustrates a portable data unit having a thermally controlled battery system according to the present invention in which the portable data unit may include an insulated battery pack receptacle.

FIG. 7 illustrates an electronic device 42 having a thermally controlled battery system according to the present invention in which the electronic device 42 includes a battery pack cavity 46. The battery pack cavity 46 receives a battery pack 10 and may be closed with a cover 48. The battery pack cavity 46 may include insulation to insulate the battery pack 10. The cover may also include insulation 50 to insulate the battery pack 10 within the battery pack cavity 46. Disposed within the electronic device 42 is a temperature varying element 44 that may comprise a heating element, a cooling element or a combination heating and cooling element.

The battery pack 10 may include an uninsulated side that contacts the temperature varying element 44 to enhance heat flow between the battery pack 10 and the temperature varying element 44. In another embodiment, the battery pack 10 may be uninsulated. In such an embodiment all insulation is provided by the insulation disposed within the battery pack cavity 46 and the cover 48.

A control circuit 24 that controls operation of the temperature varying element 44 may be contained within the battery pack 10, may be disposed external to the battery pack 10 or may be partially disposed in each depending upon the embodiment of the electronic device 42. Further a temperature sensor for sensing internal battery pack 10 temperature may be disposed within the battery pack 10 or external to the battery pack 10. In either case, the temperature sensor produces an indication of the temperature within the battery pack 10 and provides the indication to the control circuit 24.

Figure 8:
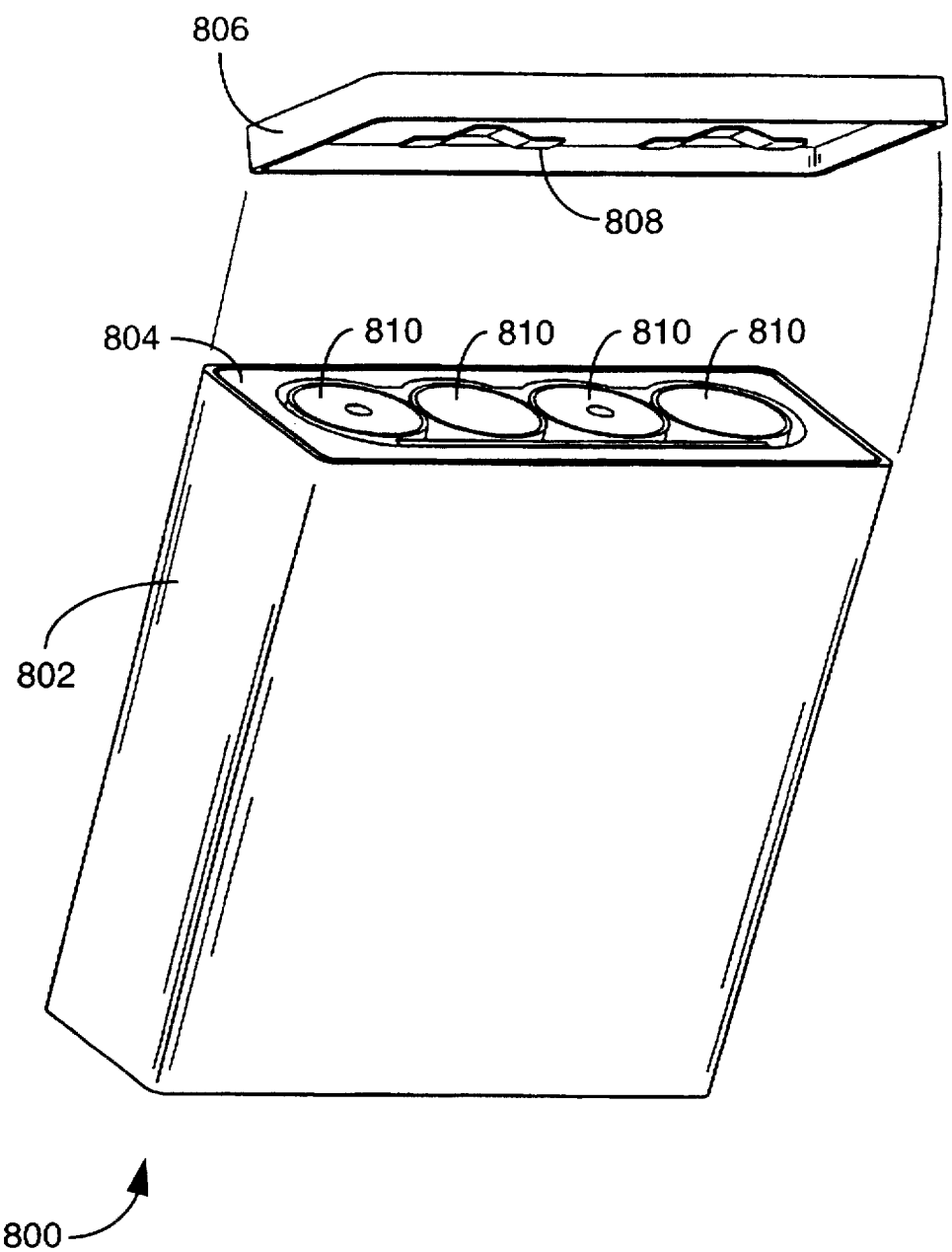
FIG. 8 is a perspective view of an alternate embodiment of a battery pack built in accordance with the present invention in which the heating unit (and possibly cooling unit) are encapsulated within an insulated housing along with a plurality of cells and associated control circuit.

FIG. 8 is a perspective view of an alternate embodiment of a battery pack 800 built in accordance with the present invention in which the heating unit 26 (and possibly cooling unit 28) are encapsulated within an insulated housing along with a plurality of cells 810 and associated control circuit 24 (not shown). The insulated housing includes an insulated bottom portion 802 and an insulated cap 806. The insulated bottom portion 802 includes 804 that surrounds the cells 810 to thermally insulate the cells 810 from an external environment. The insulated cap 806 provides required electrical contacts 808 among the cells 810.

The control circuit 24 may be contained in the cap 806 or within the insulated housing 802 to provide control to the heating unit 26 and/or cooling unit 28 contained within the insulated housing. With the control circuitry contained within the insulated housing, the battery pack 800 regulates its own internal temperature to maximize its operating duration.

Figure 9:
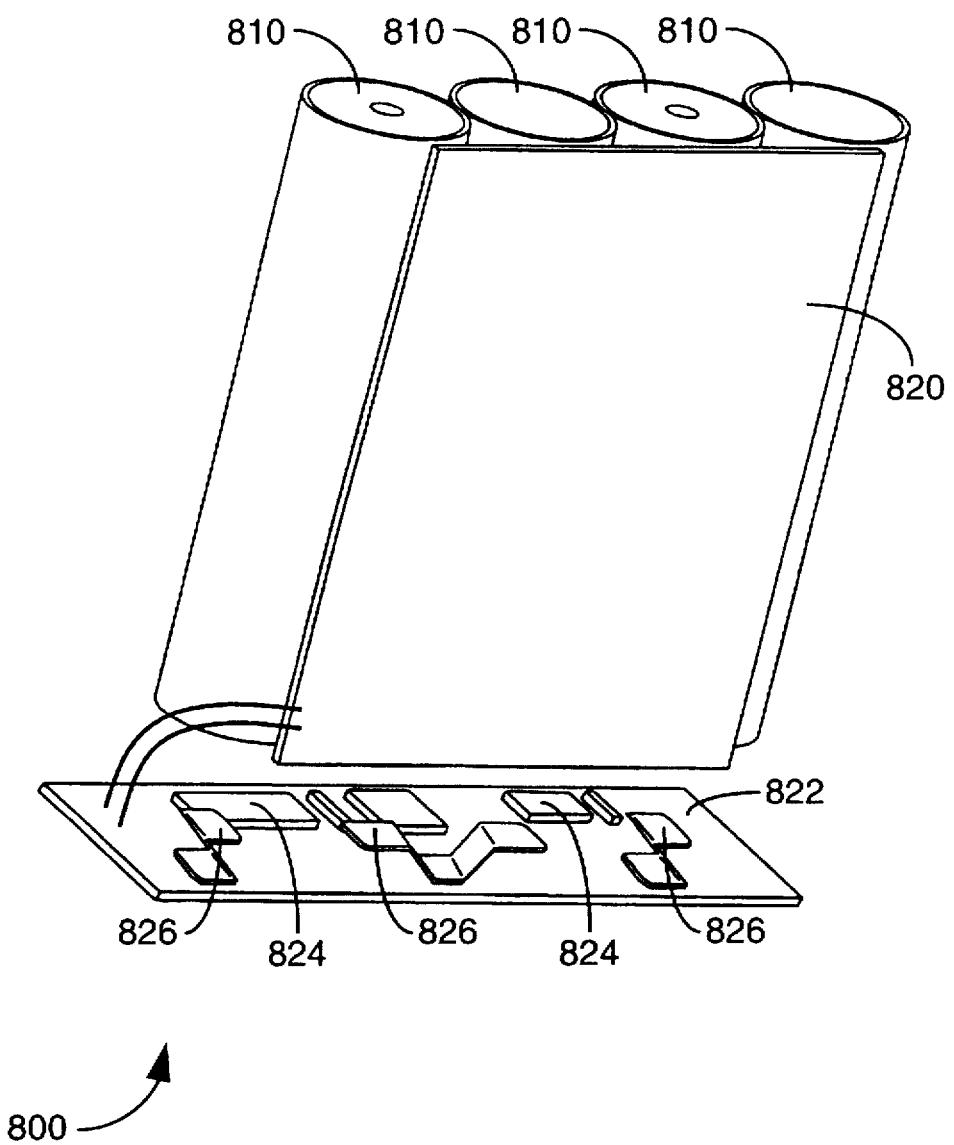
FIG. 9 is a perspective view of the battery pack of FIG. 8 wherein the insulated housing has been removed for illustrative purposes.

FIG. 9 is a perspective view of the battery pack 800 of FIG. 8 wherein the insulated housing has been removed for illustrative purposes. As shown, a temperature varying element 820 resides adjacent the cells 810 and operates to vary the temperature of the cells 810. The temperature varying element 820 receives power from a control circuit 822 that is contained within the insulated bottom portion 802 or the insulated cap 806. The control circuit 822 includes various components 824 which operate in conjunction to provide the temperature control functions according to the present invention. A plurality of contacts 826 provide electrical connections to the cells 810.

Figure 10:
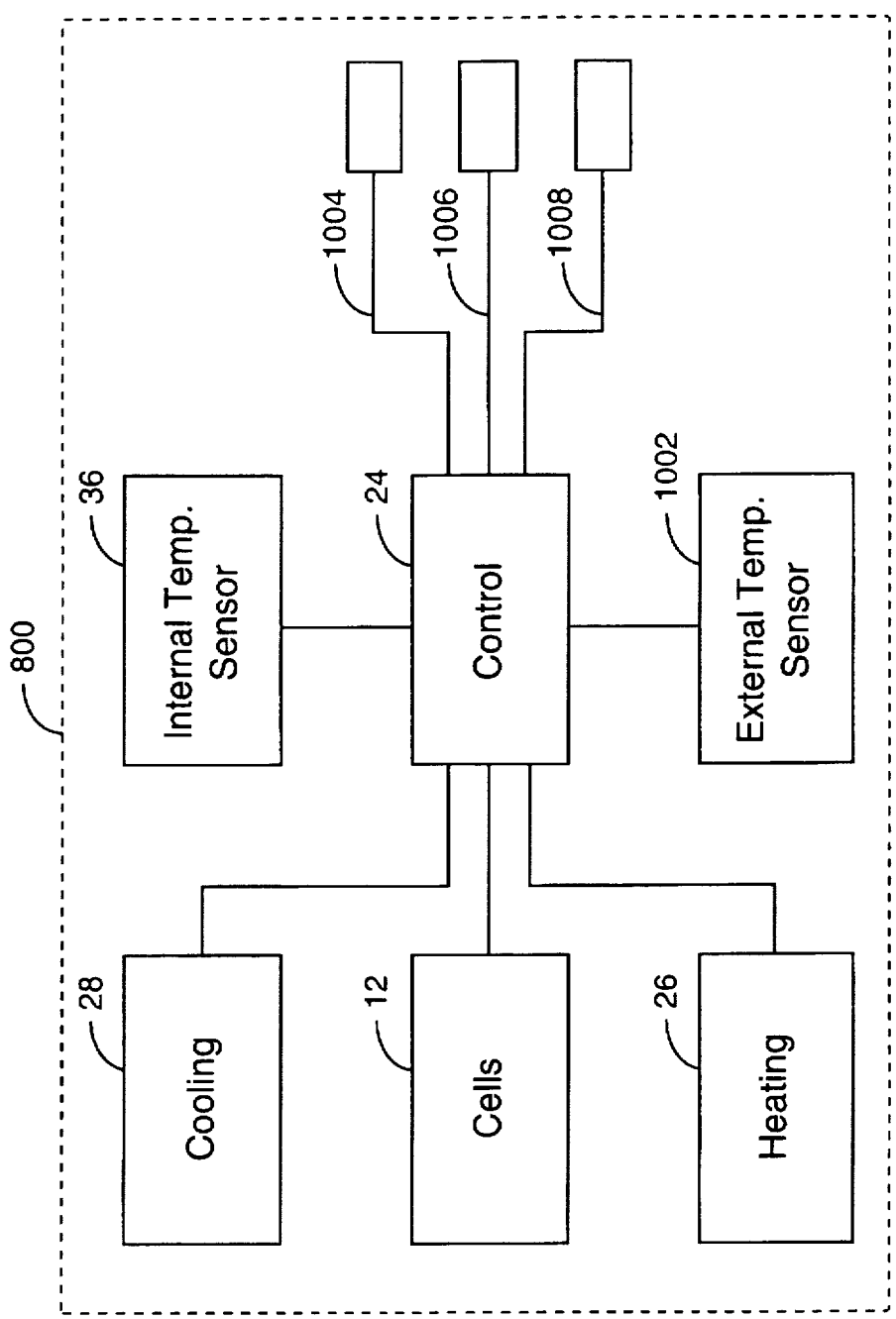
FIG. 10 is a schematic block diagram of the battery pack of FIGS. 8 and 9 which illustrates operation of the heating and cooling units during both charging and normal operation.

FIG. 10 is a schematic block diagram of the battery pack 800 of FIGS. 8 and 9 which illustrates operation of the heating unit 26 and the cooling unit 28 during both charging and normal operation. The battery pack 800 connects to the electronic device 42 or a charging station via a power line 1004, a ground line 1006 and a charging line 1008. During normal operation, the control circuitry 24 provides power to the electronic device 42 via power line 1004 and ground via ground line 1006. During charging, the control circuit 24 receives 5 charging power via charging line 1008 and ground line 1006. The control circuit 24 provides the charging power to the cells 12 to recharge the cells 12. The battery pack 800 may be recharged while residing in the electronic device 42 or may be removed from the electronic device 42 and placed in a charging station for recharging. In another embodiment, a recharge signal is received on charging line 1008 while actual charging power is received on power line 1004.

During normal operation, the control circuit 24 monitors the internal temperature sensor 36 to determine the temperature of the battery pack 10 and monitors the external temperature sensor 1002 to determine the temperature of an external environment. Based upon the temperature determinations, loading information determined from power line 1004 and 15 ground line 1006 and data on the cells 12 stored in the control circuit 24, the control circuit may control the temperature of the cells 12.

During charging, the battery pack 800 receives energy via charging line 1008 that does not originate from the cells 12. Thus, temperature regulation of the cells 12 during charging may be performed without concern as to the amount of energy consumed by the heating unit 26 and the cooling unit 28. Thus, the control circuit 24 alters the temperature of the cells 12 as is required to place the cells 12 at an optimum temperature for charging. During later portions of charging cycles, the cells 12 tend to overheat. Thus, the control circuit 24 lowers the temperature of the cells 12 during charging to prevent damage to the cells. Once charging is complete, the control circuit 24 places the cells 12 at an optimum temperature for energy retention and future use.

Figure 11:
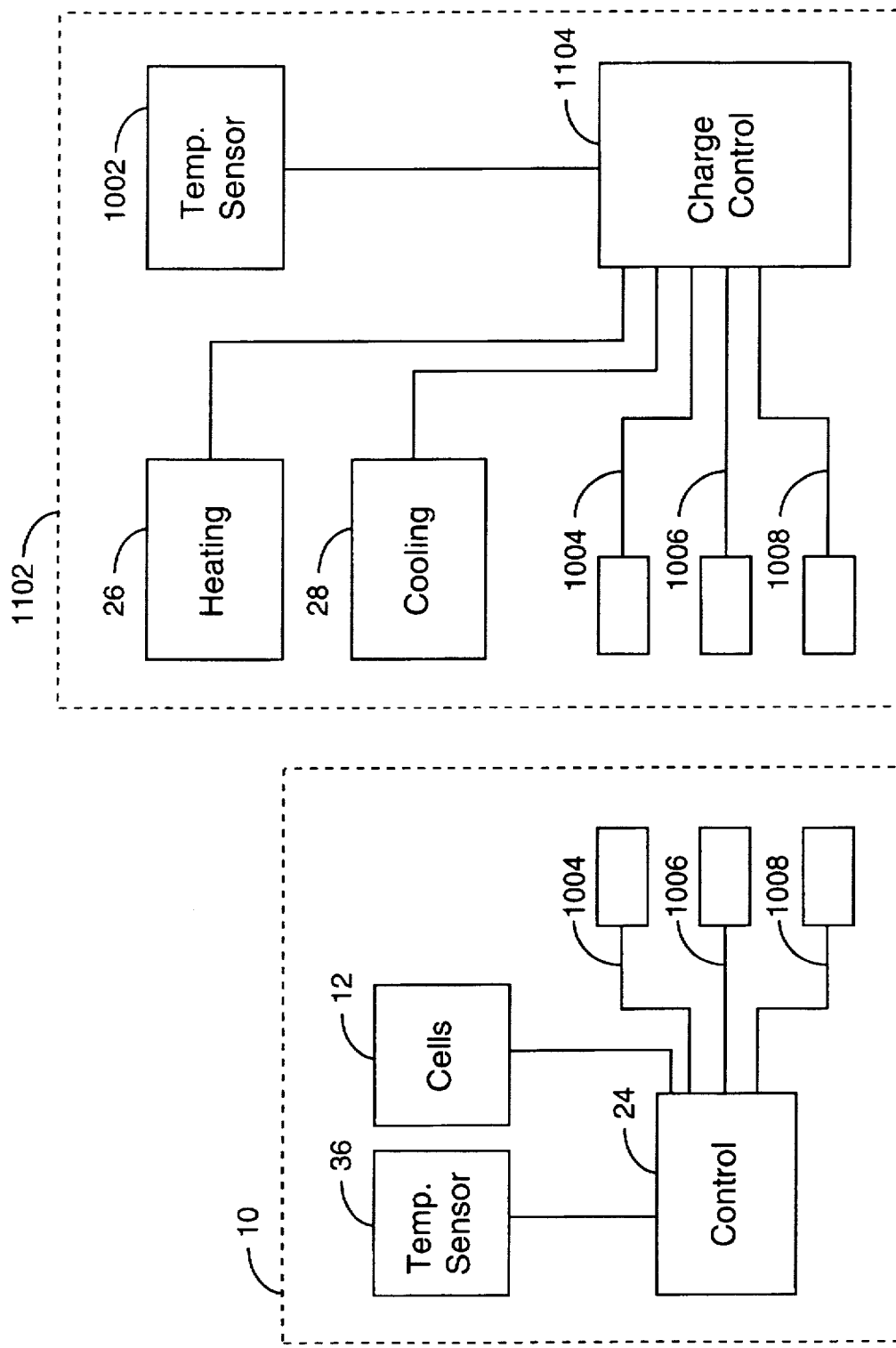
FIG. 11 is a schematic block diagram illustrating an alternate embodiment of the present invention wherein much of the temperature control functionality resides in a charging device.

FIG. 11 is a schematic block diagram illustrating an alternate embodiment 1100 of the present invention wherein much of the temperature control functionality resides in a charging device 1102. The battery pack 10 includes the cells 12, a control circuit 24 and an internal temperature sensor 36. The battery pack 10 connects to the charging device 1102 via power line 1004, ground line 1006 and charging line 1008. The charging device 1102 includes a charge control circuit 1104, a heating element 26, a cooling element 28 and a temperature sensor 1002 that senses an external environment temperature.

The charging device 1002 connects to the battery pack 10 via power line 1004, ground line 1006 and charging line 1008 during charging of the batter pack 10. During charging, the charge control circuit 1104 receives a battery pack 10 internal temperature indication from the battery pack 10. Based upon this indication, the charge control circuit 1104 operates the heating element 26 and cooling element 28 to place the battery pack 10 at an optimum temperature for charging and to prevent damage to the battery pack 10 during charging. The charging device 1002 typically operates with battery packs 10 having no internal temperature varying elements. However, the charging device 1002 could be adapted to also receive battery packs 10 that include temperature varying elements.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

I claim:

1. A battery pack used in a portable electronic device, the battery pack comprising:
   a plurality of electrochemical cells for storing and delivering energy;
   a temperature varying element;
   a temperature sensor;
   a control circuit responsive to the temperature sensor by selectively controlling the operation of the temperature varying element; and
   a housing that encloses the electrochemical cells, the temperature varying element, the temperature sensor and the control circuit.

2. The battery pack of claim 1 wherein the temperature varying element comprises a heating element.

3. The battery pack of claim 1 wherein the temperature varying element comprises a cooling element.

4. The battery pack of claim 1 wherein the control circuit selectively controls the operation of the temperature varying element by considering whether the energy required to conduct such operation is predicted to yield overall energy savings.

5. The battery pack of claim 1 wherein the control circuit selectively controls the operation of the temperature varying element by considering whether the battery pack is in use.

6. The battery pack of claim 1 wherein the control circuit selectively controls the operation of the temperature varying element by considering the likelihood of battery damage without such operation.

7. The battery pack of claim 1 wherein the control circuit selectively controls the operation of the temperature varying element to reach a target temperature within the housing.

8. The battery pack of claim 1 wherein the control circuit selectively controls the operation of the temperature varying element by considering whether the battery pack has access to energy not originating from the plurality of electrochemical cells.

9. The battery pack of claim 1 wherein the control circuit selectively controls the operation of the temperature varying element by considering whether the battery pack is being charged.

10. The battery pack of claim 1 wherein the control circuit selectively controls the operation of the temperature varying element by considering the energy efficiency of such operation.

11. The battery pack of claim 10 wherein such consideration comprises at least a first threshold temperature to enable the temperature varying element and at least a second threshold temperature to disable the temperature varying element.

12. A portable electronic device operating from battery power, the portable electronic device comprising:
   at least one rechargeable electrochemical cell for storing energy and delivering energy at an output voltage and an output current;
   a temperature sensor;
   a battery pack housing that encloses at least the temperature sensor and the at least one electrochemical cell;

the temperature sensor producing an indication of the temperature within the battery pack housing;

a temperature varying element disposed to affect the temperature within the battery pack housing; and a control circuit responsive to the temperature sensor by selectively controlling the operation of the temperature varying element.

13. The portable electronic device of claim 12 wherein the temperature varying element and at least part of the control circuit is disposed within the portable electronic device external to the battery pack housing.

14. The portable electronic device of claim 12 wherein the temperature varying element and at least part of the control circuit is disposed within the battery pack housing.

15. The portable electronic device of claim 14 further comprising a second temperature sensor that produces an indication of the temperature outside of the battery pack housing.

16. The portable electronic device of claim 12 wherein the control circuit selectively controls the operation of the temperature varying element by considering the energy efficiency of such operation.

17. The portable electronic device of claim 12 wherein the control circuit selectively controls the operation of the temperature varying element by considering whether the battery pack is in use.

18. The portable electronic device of claim 12 wherein the control circuit selectively controls the operation of the temperature varying element by considering the likelihood of battery damage without such operation.

19. The portable electronic device of claim 12 wherein the control circuit selectively controls the operation of the temperature varying element to reach a target temperature within the housing.

20. The portable electronic device of claim 12 wherein the control circuit selectively controls the operation of the temperature varying element by considering whether the battery pack has access to energy not originating from the at least one electrochemical cells.

* * * * *